(12) United States Patent
Fukuta

(10) Patent No.: US 6,804,028 B1
(45) Date of Patent: Oct. 12, 2004

(54) IMAGE PROCESSING APPARATUS AND METHOD, AND STORAGE MEDIUM STORING COMPUTER-READABLE PROGRAM

(75) Inventor: Shigenori Fukuta, Kawaguchi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/572,587

(22) Filed: May 17, 2000

(30) Foreign Application Priority Data

May 20, 1999 (JP) ............................. 11-139624
Mar. 10, 2000 (JP) ........................... 2000-066385

(51) Int. Cl.[7] .......................... H04N 1/40; G06K 15/00
(52) U.S. Cl. ..................... 358/2.1; 382/180; 358/2.1; 358/3.01
(58) Field of Search ..................... 358/2.1, 401, 1.14, 358/471, 472, 498, 3.21, 3.24, 538; 382/173, 176, 164, 180, 190; 347/43, 3

(56) References Cited

U.S. PATENT DOCUMENTS

| | | | | |
|---|---|---|---|---|
| 5,175,635 A | * | 12/1992 | Yamada et al. | 358/2.1 |
| 5,966,468 A | * | 10/1999 | Fujimoto | 382/239 |
| 6,538,769 B2 | * | 3/2003 | Yoshida et al. | 358/1.9 |
| 6,557,963 B1 | * | 5/2003 | Ikeda | 347/14 |
| 6,597,472 B1 | * | 7/2003 | Suzuki et al. | 358/1.9 |

* cited by examiner

*Primary Examiner*—Kimberly Williams
*Assistant Examiner*—Melanie Vida
(74) *Attorney, Agent, or Firm*—Fitzpatrick, Cella, Harper & Scinto

(57) ABSTRACT

In order to efficiently output image data having superior image quality in comparison with that of an image development process dependent on a single development process resource, PDL data based on a plurality of page description languages is received from an external host computer via a host I/F. A CPU determines whether the image information in the PDL data is color image information or monochrome image information. A first development process, which is most suitable for color image information, and a second development process, which is most suitable for monochrome image information, are performed in a parallel manner. The developed color image information and monochrome image information are merged in a frame memory and are output to a color copier.

21 Claims, 15 Drawing Sheets

| DIRECTORY INFORMATION |
|---|
| FIRST DATA PROCESSING PROGRAM<br>PROGRAM CODE GROUP CORRESPONDING TO<br>STEPS OF FLOWCHART SHOWN IN FIG. 5 |
| SECOND DATA PROCESSING PROGRAM<br>PROGRAM CODE GROUP CORRESPONDING TO<br>STEPS OF FLOWCHART SHOWN IN FIGS. 7 AND 8 |
| THIRD DATA PROCESSING PROGRAM<br>PROGRAM CODE GROUP CORRESPONDING TO<br>STEPS OF FLOWCHART SHOWN IN FIG. 9 |
| FIRST DATA PROCESSING PROGRAM ON IMAGE<br>PROCESSING APPARATUS SIDE<br>PROGRAM CODE GROUP CORRESPONDING TO<br>STEPS OF FLOWCHART SHOWN IN FIG. 6 ON<br>COLOR COPIER SIDE |
| |

MEMORY MAP OF STORAGE MEDIUM

FIG. 10

IMAGE PROCESSING APPARATUS AND METHOD, AND STORAGE MEDIUM STORING COMPUTER-READABLE PROGRAM

BACKGROUND OF THE INVENTION

1. Field of the Invention

The present invention relates to an image processing apparatus and method in which PDL image information (hereinafter referred to as "PDL data") described in a page description language is received, in which the PDL data is processed by the image processing apparatus, and in which an image is formed in an image forming apparatus, etc., and relates also to a storage medium for storing a computer-readable program.

2. Description of the Related Art

Recently, a system has been proposed in which PDL data is received from a host computer via a network, the PDL data is converted into print data (hereinafter referred to as "image development") inside an image processing apparatus, and the data is sent to a high-quality color copier, whereby it is printed on various recording media, such as paper, an OHP sheet, etc.

Also, recently, as image development means, an image processing apparatus in which both a PostScript interpreter and a PCL (Hewlett-Packard's Printer Control Language) interpreter are installed, and the interpreters are switched to perform image development in accordance with PDL data sent from a host computer, has already been manufactured.

However, in the above-described conventional example, there is a need to preinstall, in a host computer, printer drivers for creating each set of PDL data, and the drivers must be selected to perform printing in the host computer, depending on the application.

For this reason, when a particular driver is selected and printing is performed, only the interpreter corresponding to the selected driver can be used. Thus, even if both interpreters for PostScript and PCL are installed, the current state is that one or the other of the interpreters is used in practice, and not both.

The features of these two interpreters are as follows. The PostScript interpreter is an interpreter installed in almost every printer (to such a degree that it is called the industry standard in the printer field), and color rendering dictionaries are common, and the image development of color PDL data is highly rated. The PCL interpreter, on the other hand, boasts a market share such that it is called the industry standard in the monochrome printer field, and is advantageous in the processing performance of monochrome PDL data.

SUMMARY OF THE INVENTION

The present invention has been achieved in view of such circumstances. An object of the present invention is to effectively use PDL data development means in order to efficiently output a high-quality image.

To achieve the above-mentioned object, according to one aspect of the present invention, there is provided an image processing apparatus comprising: a receiving unit for receiving image information, based on first and second page description languages, which is input from an external data processing apparatus; a determination unit, or image-type discriminator, for determining which one of color image information and monochrome image information the image information received by the receiving unit is; a first development unit, which analyzes the color image information determined by the determination unit and develops it into color image data for each pixel; a second development unit, which analyzes the monochrome image information determined by the determination unit and develops it into monochrome image data for each pixel; a merging unit for merging the color image data and the monochrome image data developed respectively by the first and second development units in a page sequence; a storage unit for storing the output image data merged by the merging unit; and an output unit for outputting the output image data stored by the storage unit to an external image output apparatus.

According to another aspect of the present invention, there is provided an image processing method comprising: receiving image information, based on first and second page description languages, which is input from an external data processing apparatus; determining which one of color image information and monochrome image information the image information received in the receiving step is; developing the color image information determined in the determining step into color image data for each pixel; developing the monochrome image information determined in the determining step into monochrome image data for each pixel; a merging step for merging the color image data and the monochrome image data developed in the developing steps in a page sequence; storing the output image data merged in the merging step in a storage apparatus; and outputting the output image data stored in the storage apparatus to an external image output apparatus.

According to another aspect of the present invention, there is provided a storage medium storing a computer-readable program comprising code for: receiving image information, based on first and second page description languages, which is input from an external data processing apparatus; determining which one of color image information and monochrome image information the image information received in the receiving step is; developing the color image information determined in the determining step into color image data for each pixel; developing the monochrome image information determined in the determining step into monochrome image data for each pixel; merging the color image data and the monochrome image data developed in the developing steps in a page sequence; storing the output image data merged in the merging step in a storage apparatus; and outputting the output image data stored in the storage apparatus to an external image output apparatus.

The above and further objects, aspects and novel features of the invention will become more fully apparent from the following detailed description when read in conjunction with the accompanying drawings.

BRIEF DESCRIPTION OF THE DRAWINGS

FIG. 10 shows a memory map of a storage medium for storing various data processing programs which can be read by an image processing system to which the image processing apparatus according to the present invention can be applied;

DETAILED DESCRIPTION OF THE PREFERRED EMBODIMENTS

First Embodiment

General View of Apparatus

Figure 1:
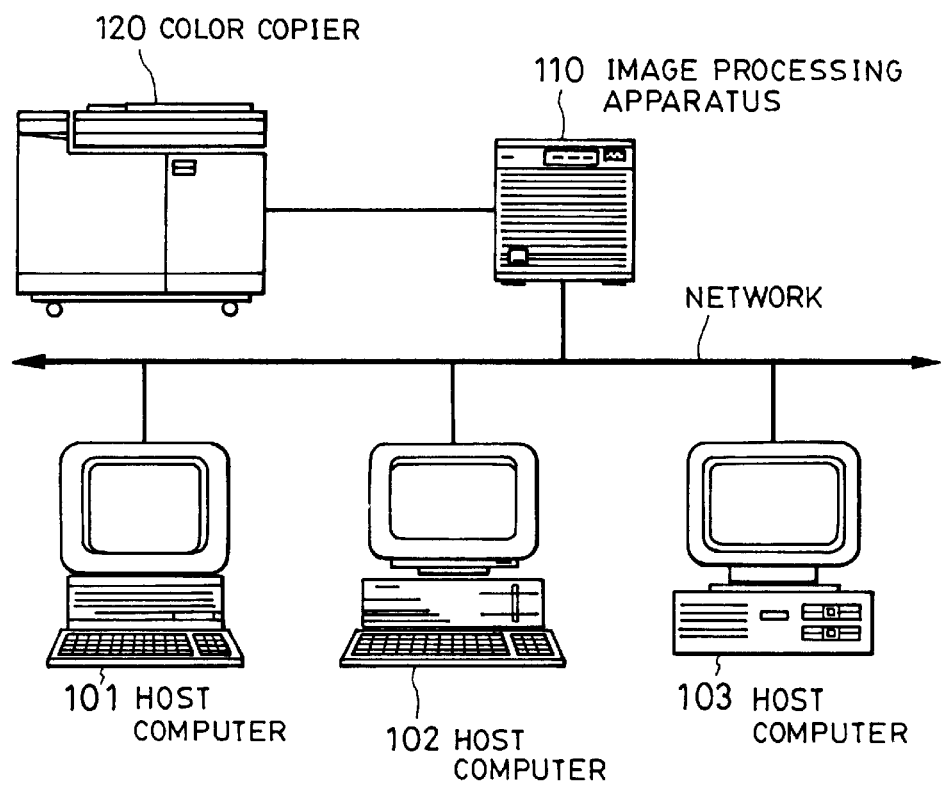
FIG. 1 shows an example of an image processing system to which an image processing apparatus according to the present invention can be applied.

FIG. 1 shows an example of an image processing system to which an image processing apparatus according to the present invention can be applied. For example, the image processing system corresponds to an image processing system in which a plurality of host computers can each communicate with an image processing apparatus for controlling a color copier via a network.

Referring to FIG. 1, reference numerals 101 to 103 denote host computers, which are formed of, for example, a personal computer. The host computer actuates a predetermined installed OS in order to execute various applications, and makes an image processing request to an image processing apparatus 110 in accordance with a predetermined protocol. Reference numeral 120 denotes a color copier, which outputs a read image and outputs an image of input image data on the basis of an image processing request from the image processing apparatus 110.

Figure 2:
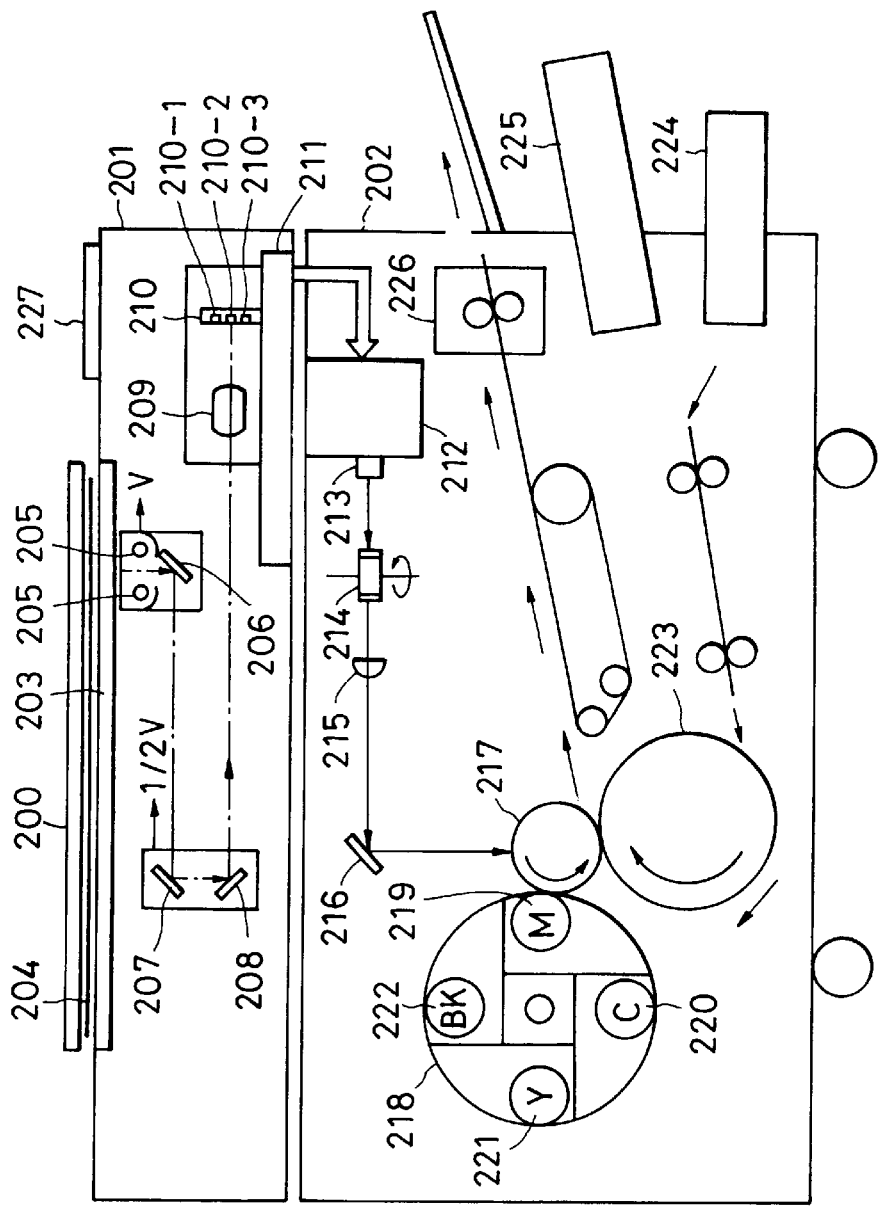
FIG. 2 is a schematic sectional view illustrating the construction of a color copier shown in FIG. 1.

FIG. 2 is a schematic sectional view illustrating the construction of the color copier 120 shown in FIG. 1.

Referring to FIG. 2, reference numeral 201 denotes an image scanner section, which is a section for reading an image of the original document at a resolution of 400 dpi (dots/inch) and performing digital signal processing. Reference numeral 202 denotes a printer section, which is a section for printing an image corresponding to the original document image read by the image scanner section 201 on printing paper in full color at a resolution of 400 dpi.

In the image scanner section 201, reference numeral 200 denotes a mirror pressure plate. An original document 204 on a document holder glass (hereinafter referred to as a "platen") 203 is illuminated by a lamp 205 and is guided to mirrors 206, 207, and 208, and an image thereof is focused on a three-line sensor (hereinafter referred to as a "CCD") 210 by means of a lens 209, and is sent as full-color information, including red (R), green (G), and blue (B) components, to a signal processing section 211. The lamp 205 and the mirror 206 are moved mechanically in a direction perpendicular to the direction of electrical scanning (main scanning) of the line sensors, at a speed of V, while mirrors 207 and 208 are mechanically moved at a speed of ½ V, thereby scanning (subscanning) the entire surface of the original document.

In the signal processing section 211, the read image signal is electrically processed so that it is separated into components of magenta (M), cyan (C), yellow (Y), and black (Bk), and these components are sent to the printer section 202. For each scanning of the original document in the image scanner section 201, one component of M, C, Y, and Bk is sent to the printer section 202, and one printout is completed by a total of four scannings of the original document.

Each image signal M, C, Y, or Bk, sent from the image scanner section 201, is sent to a laser driver 212. The laser driver 212 modulates a semiconductor laser 213 in accordance with the received image signal, and the modulated laser light scans a photosensitive drum 217 via a polygonal mirror 214, an f-θ lens 215, and a mirror 216.

Reference numeral 218 denotes a rotary developer, which comprises a magenta development section 219, a cyan development section 220, a yellow development section 221, and a black development section 222. The four development sections alternately come into contact with the photosensitive drum 217 and develop by toner an electrostatic latent image formed on the photosensitive drum 217.

Reference numeral 223 denotes a transfer drum, around which printing paper supplied from a paper cassette 224 or 225 is wound, which transfers the image developed on the photosensitive drum 217 onto the paper.

In this manner, after the four colors M, C, Y, and Bk are transferred in sequence, the printing paper is passed over a fixing unit 226, and after the toner for each color is fixed onto the printing paper, the printing paper is ejected.

Output to Color Copier

Figure 3:
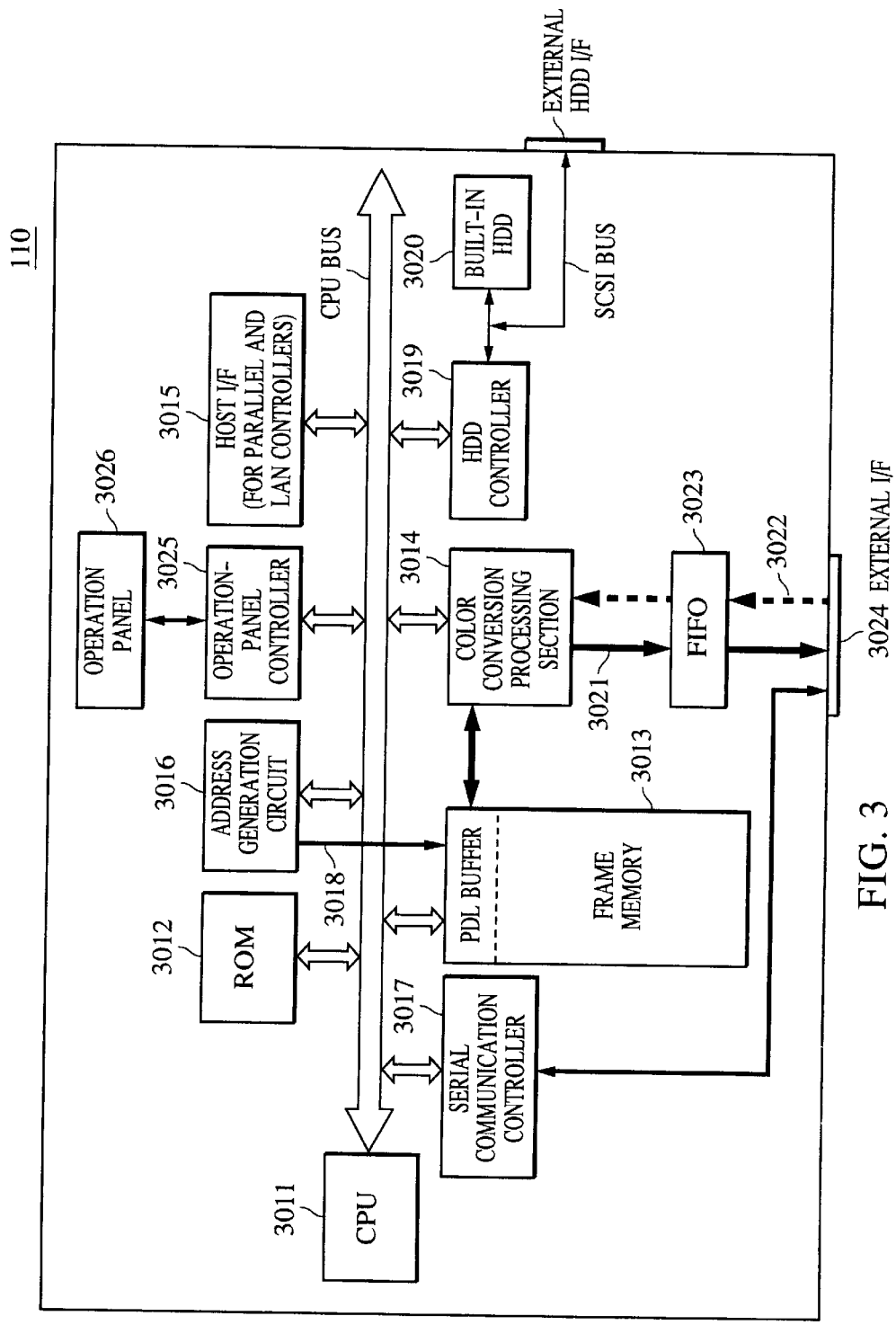
FIG. 3 is an internal block diagram illustrating the construction of the image processing apparatus shown in FIG. 1.

FIG. 3 is an internal block diagram illustrating the construction of the image processing apparatus 110 shown in FIG. 1.

Referring to FIG. 3, reference numeral 3011 denotes a CPU which controls the entire image processing apparatus in accordance with a program stored in a ROM 3012. At the same time, since this CPU 3011 must perform an image development process for PDL data (PostScript/PCL data) in a parallel manner, it is preferable that a RISC (Reduced Instruction Set Computer)-CPU having a high processing speed be used.

Initially, PDL data from one of the host computers 101 to 103 is received via a host I/F 3015 for a parallel controller and a LAN controller. At this time, the PDL data is sent from one of the host computers 101 to 103 via the host I/F 3015, and the cables may be connected at the same time. When there is a request from the host computers 101 to 103, each interface can be switched automatically. SERIAL COMMUNICATION CONTROLLER 3017 controls serial communication and connects to CPU BUS of the image processing apparatus 110.

While the PDL data is being received or processed, it is possible for an operation-panel controller 3025 and an operation panel 3026 to display a processing status, etc. This makes it possible for a user to be informed of the current state of the image processing apparatus.

Next, the received PDL data is temporarily stored in an area (PDL buffer) of a part of a DRAM 3013 via the CPU bus. Then, the CPU 3011 performs image development from the received PDL data to raster image data (red, green, and blue) by using font data stored in the ROM 3012, a built-in HDD 3020, or an external HDD. HDD CONTROLLER 3019 controls the built-in HDD 3020 or the external HDD.

Then, an address generation circuit 3016 generates an address 3018 for writing into each frame memory in the DRAM 3013, causing the raster image data to be stored in the DRAM 3013. Thereafter, the data is sent from the DRAM 3013 to a color conversion processing section 3014 whereby a color conversion process is performed thereon. That is, raster image data of red, green, and blue is converted into raster image data (cyan, magenta, yellow, and black) which can be printed by a color copier (see FIG. 2).

The above-described color copier is a color electrophotographic copier for forming images in surface sequence with respect to a plurality of output color components cyan, magenta, yellow, and black. Therefore, the raster image data stored in the DRAM 3013 is temporarily stored in a FIFO 3023 so that it can be read as synchronized image data in accordance with a synchronization signal (not shown) from the color copier.

Then, the raster image data is sent to the color copier via an external I/F section 3024. At the same time, the color copier forms an image on the basis of the raster image data.

Host Computer

Figure 4:
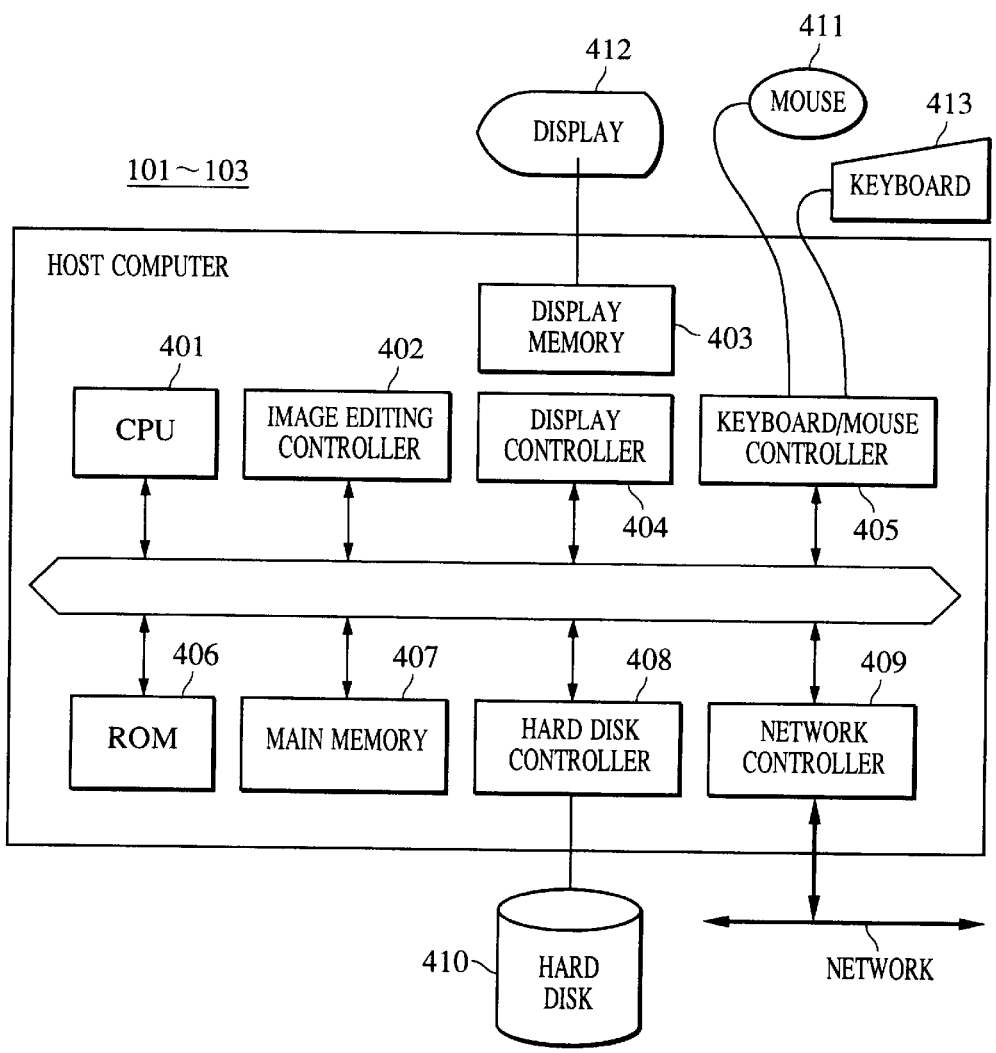
FIG. 4 is a block diagram illustrating the construction of a host computer in a network shown in FIG. 1.

FIG. 4 is a block diagram illustrating the construction of the host computers 101 to 103 in the network shown in FIG. 1. The data processing performance and the memory capacity of each of the host computers 101 to 103 may differ.

Referring to FIG. 4, reference numeral 401 denotes a CPU which centrally manages the control of host computers in accordance with a program stored in a ROM 406 or a hard disk 410. The host computer also comprises a network controller 409 for controlling protocols in the network. Reference numeral 407 denotes a main memory which functions as a work memory for the CPU 401.

Reference numeral 408 denotes a hard disk controller which controls access to the hard disk 410 for the purpose of temporarily entering image data and storing various types of data. Reference numeral 411 denotes a pointing device which functions as a mouse serving as a means for inputting an instruction from an operator. Reference numeral 413 denotes a keyboard which is controlled by a keyboard/mouse controller 405 for control thereof.

Reference numeral 412 denotes a color display on which layout/editing menu display, etc., is performed via a display memory 403. Reference numeral 404 denotes a display controller. Reference numeral 402 denotes an image editing controller by which image layout/editing is performed on the display memory 403.

In the hard disk 410, various types of printer drivers are preinstalled, so that PDL data based on a first or second selected page description language is created, or PDL data which can be analyzed by both the interpreters on the image processing apparatus 110 side, for analyzing the PDL data of the first and second page description languages (for example, PostScript ("PS"), PCL, etc.) can be created.

Figure 11:
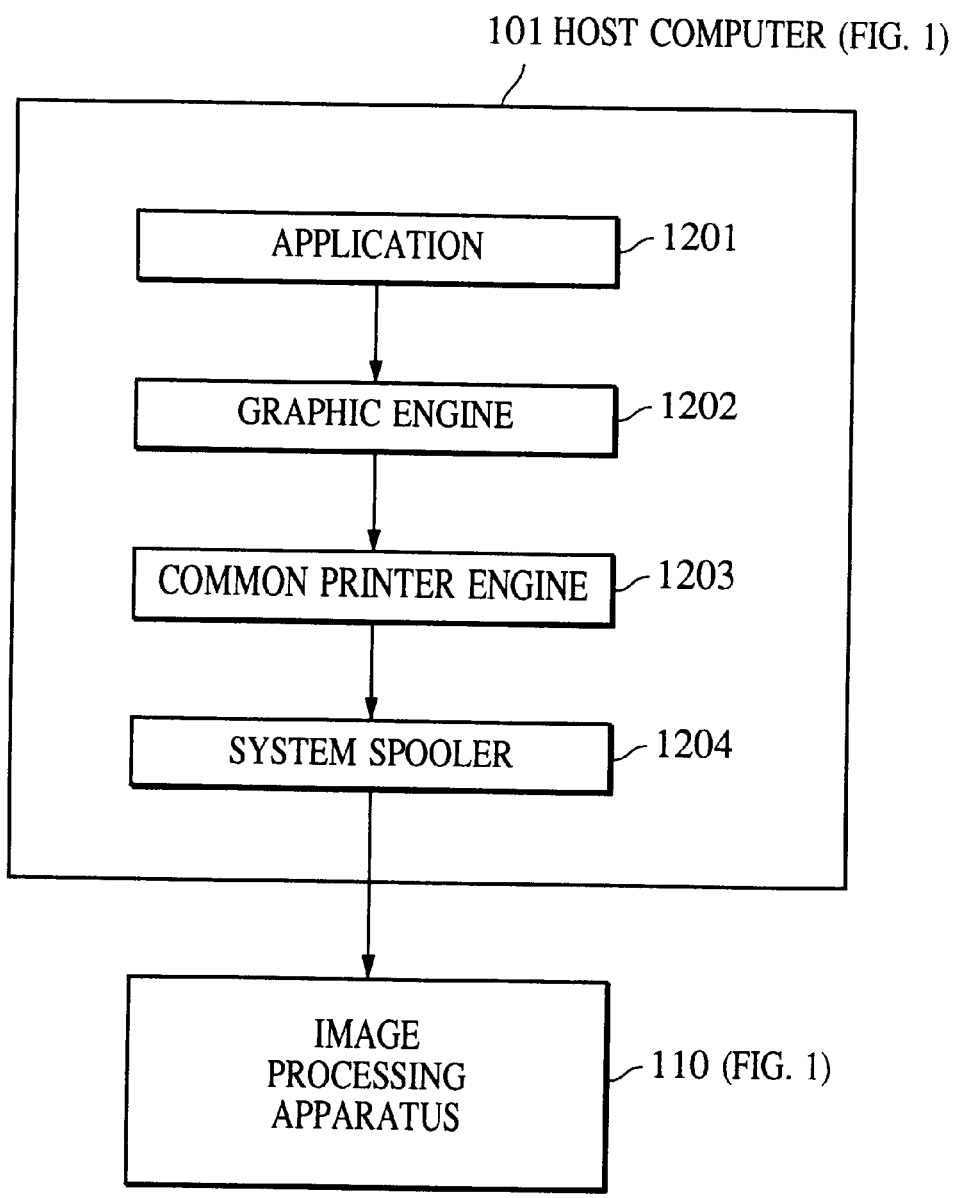
FIG. 11 is a block diagram illustrating the construction of a host computer in the image processing system according to the present invention.

FIG. 11 is a block diagram illustrating the construction of a host computer in the image processing system shown in FIG. 1, which corresponds to the construction of a program module in the host computer. This embodiment is applicable to a host computer in which the host computers 101 to 103 and the image processing apparatus 110 are directly connected to each other or are connected via a network.

Referring to FIG. 11, an application 1201, a graphic engine 1202, a common printer driver 1203 for outputting PDL data which does not depend on a specific page description language (for example, PostScript, PCL, etc.), and a system spooler 1204 are present as files stored in the external storage 410 (hard disk) (FIG. 4), and function as program modules which are loaded into the main memory 407 (FIG. 4) and executed by the OS and a module which uses the module.

Also, the application 1201 and the common printer driver 1203 can be installed as required into the HD of the external storage 410 (FIG. 4) via an FD (not shown) and a CD-ROM (not shown), which are external storage media, or via a network (not shown). The application 1201 stored in the external storage 410 is loaded into the main memory 407 and is executed. When printing is performed from this application 1201 to the image processing apparatus 110, output (drawing) is performed by using the graphic engine 1202 which has been loaded into the main memory 407 and which has become executable in a similar manner.

The graphic engine 1202 causes the common printer driver 1203 provided for this image processing apparatus to be loaded from the external storage 410 to the main memory 407 in a similar manner, and the output of an application 1201 is converted into a control command of the image processing apparatus 110 by using the common printer driver 1203. Then, the converted printer command is passed through the system spooler 1204 loaded into the main memory 407 by the OS and is then output to the image processing apparatus 110 (FIG. 1) via the interface.

In this embodiment, an image processing system comprising the image processing apparatus and the host computers shown in FIG. 1 is presupposed. Furthermore, as shown in FIG. 12 (which is described below), a system for spooling printing data from the application, as image information (it may be PDL intermediate code data, and this description assumes it is PDL intermediate data) which is independent of the image processing apparatus, is presupposed.

Figure 12:
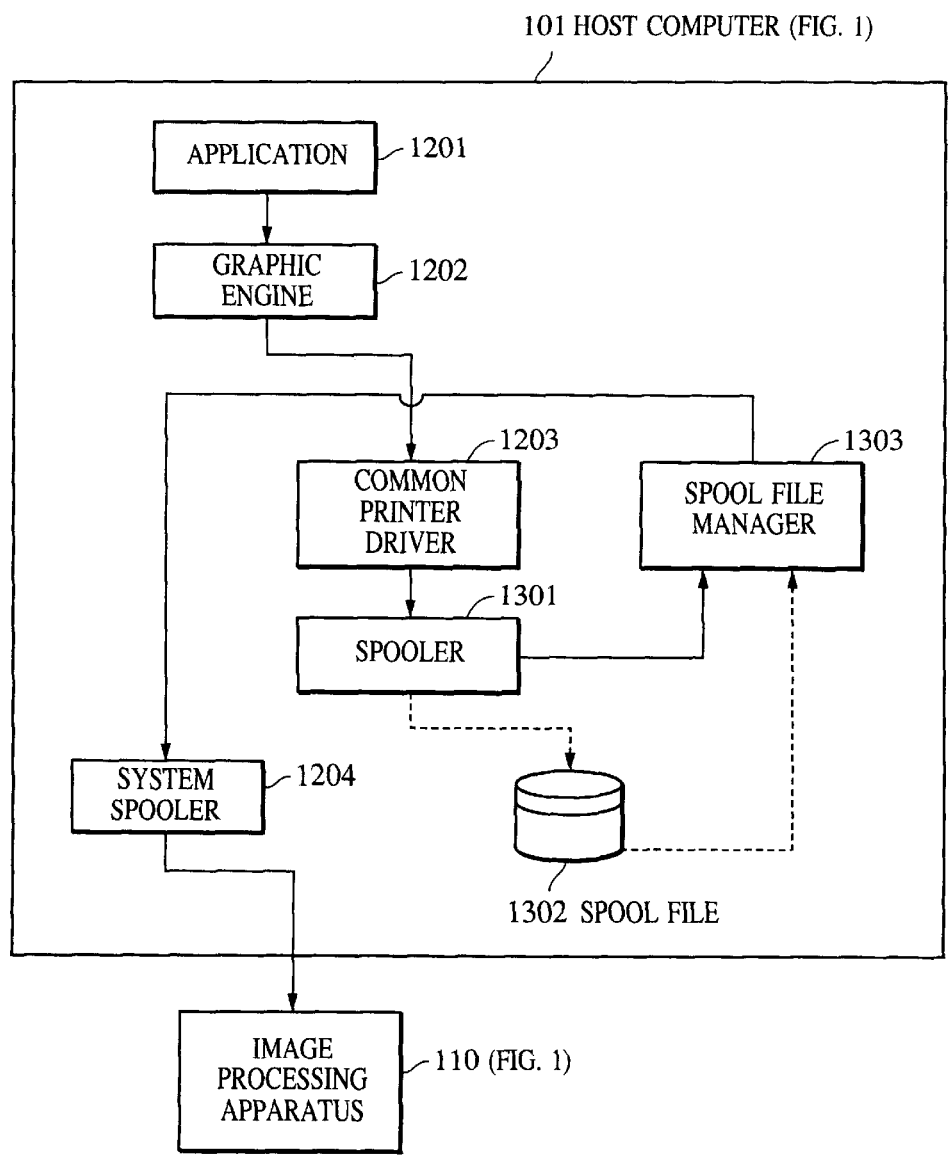
FIG. 12 is a block diagram illustrating in detail the construction of a host computer in the image processing system according to the present invention.

FIG. 12 shows an expansion of the system of FIG. 11, which takes the form in which when a print command is sent from the graphic engine 1202 to the common printer driver 1203, a spool file 1302 formed of intermediate codes is created once. In the image processing system shown in FIG. 1, the time when the application 1201 is released from the printing process is when the common printer driver 1203 completely converts all the printing commands from the graphic engine 1202 into control commands for the image processing apparatus, whereas in the system shown in FIG. 12, the time is when a spooler 1301 completely outputs all the printing commands to the spool file 1302. Normally, the latter takes less time. Also, an advantage of adopting intermediate data is that a shorter time is required to perform image development in the image processing apparatus. The details of FIG. 12 are described below.

FIG. 12 is a block diagram illustrating the construction of a host computer in the image processing system shown in FIG. 1. The components which are the same as those of FIG. 11 are given the same reference numerals. The construction and the operation of the host computer are described below.

In this expanded processing method, a print command from the graphic engine 1202 is received by the common printer driver 1203. When the common printer driver 1203 receives it from the graphic engine 1202, the common printer driver 1203 loads a spooler 1301 stored in the external storage 410 (FIG. 4) into the main memory 407 (FIG. 4), and sends the print command to the spooler 1301. The spooler 1301 outputs the received print command to the spool file 1302.

Also, the spooler 1301 obtains the processing setting for the print data, set for the common printer driver 1203, from the common printer driver 1203 and stores it in the spool file 1302.

The spool file 1302 is created as a file in the external storage 410, and may also be created in the main memory 407. Furthermore, the spooler 1301 loads a spool file manager 1303 stored in the external storage 410 into the main memory and notifies the spool file manager 1303 of the creation situation of the spool file 1302. Thereafter, the spool file manager 1303 performs an output to the image processing apparatus 110 (FIG. 1) via the system spooler 1204.

Figure 13:
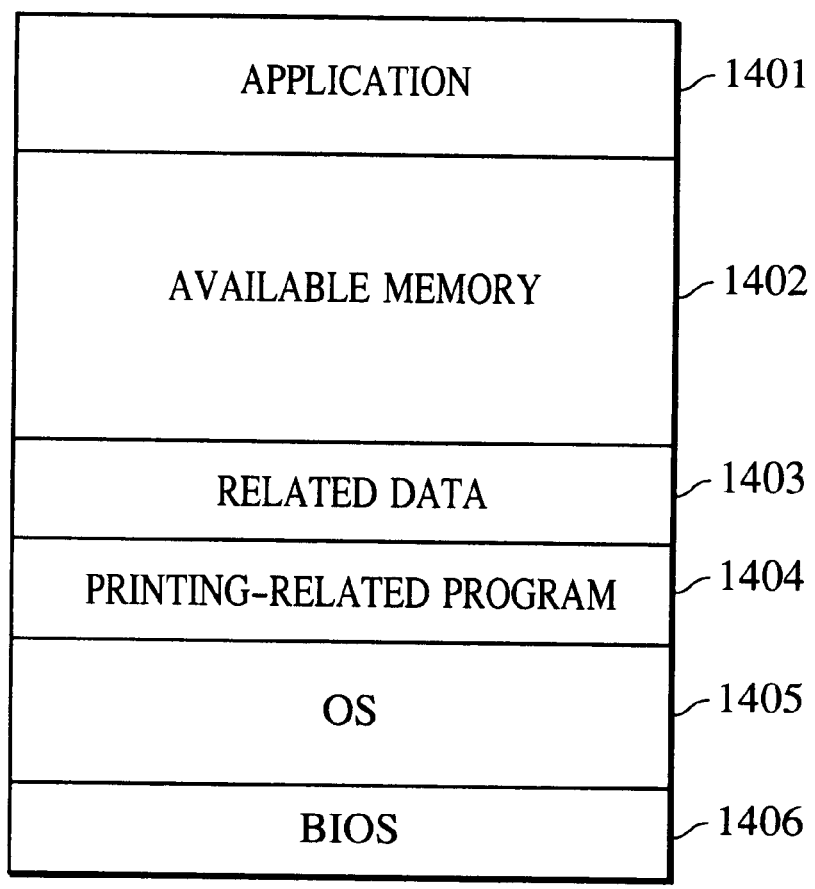
FIG. 13 is a block diagram showing a memory map in a state in which a printing-related module containing an automatic print mode control program is loaded onto the main memory of the host computer and is then ready for execution in the present invention.

FIG. 13 shows an example of a memory map of the main memory 407 shown in FIG. 4, which corresponds to a state in which the printing program is loaded into the main memory 407 in the host computer and is then executable. The print control program in this embodiment exists as a part of a printing program 1404.

In FIG. 13, reference numeral 1401 denotes an application, which is loaded from the external storage 410, etc., to the main memory 407. Reference numeral 1402 denotes an available memory, which functions as a work memory for the CPU 401 (FIG. 4). Reference numeral 1403 denotes related data. Reference numeral 1404 denotes a printing-related program, which is loaded from the external storage 410, etc., to the main memory 407. Reference numeral 1405 denotes an OS. Reference numeral 1406 denotes a BIOS, which controls input/output devices.

Figure 14:
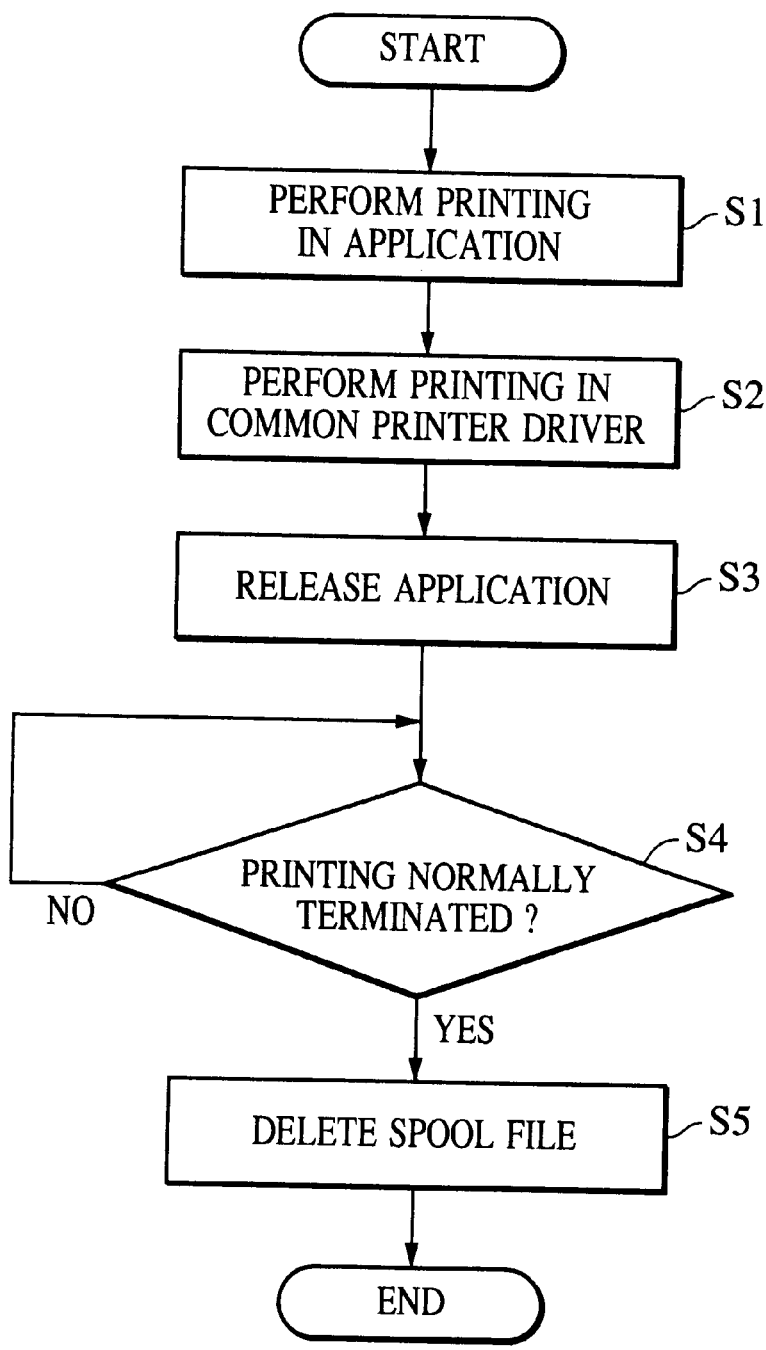
FIG. 14 is a flowchart showing an example of the first data processing procedure in the host computer according to the present invention.

Next, FIG. 14 is a flowchart showing an example of a first data processing procedure in the host computer according to the present invention. S1 to S5 each indicate a step. The processing in this embodiment starts when a user specifies the printer of a printing destination and instructs the execution of printing by the application 1201 which is loaded into the main memory 407 and is being executed under the control of the OS 1405, as shown in FIG. 13.

When the starting of printing is instructed by the user, initially, in step S1, the application 1201 makes the graphic engine 1202 perform the print command until there is no print data. In the subsequent step S2, the graphic engine 1202 receiving the print command from the application 1201 calls the common printer driver 1203 specified by the user onto the main memory 407 so as to perform printing.

Then, the common printer driver 1203 calls the spooler 1301 and stores the received print command in the spool file 1302. When the common printer driver 1203 converts all the print commands from the graphic engine 1202 into intermediate codes in this manner and stores them in the spool file 1302, and thus processing is terminated, the application 1201 is released in step S3.

Next, as described earlier with reference to FIG. 12, printing is performed via the spool file manager 1303 and the graphic engine 1202.

Next, in step S4, the spool file manager 1303 confirms whether or not printing has been terminated normally. Actual confirmation is performed by monitoring the processing status (whether printing has been terminated normally or abnormally) of each module in the flow of the printing process. In this embodiment, determination of whether the printing process has been terminated normally or abnormally is performed by monitoring the status of the graphic engine 1202, the system spooler 1204, and the image processing apparatus 110. Examples of abnormal termination include insufficient memory and insufficient disk space in the graphic engine 1202, error in data transmission to the image processing apparatus in the system spooler 1204, paper jamming in the printer, etc.

When it is determined in step S4 that printing has been terminated normally, in step S5, the spool file manager 1303 deletes the spool file 1302, terminating all processing.

Image Processing Apparatus

Control which best shows the features of the present invention is described below.

Figure 5:
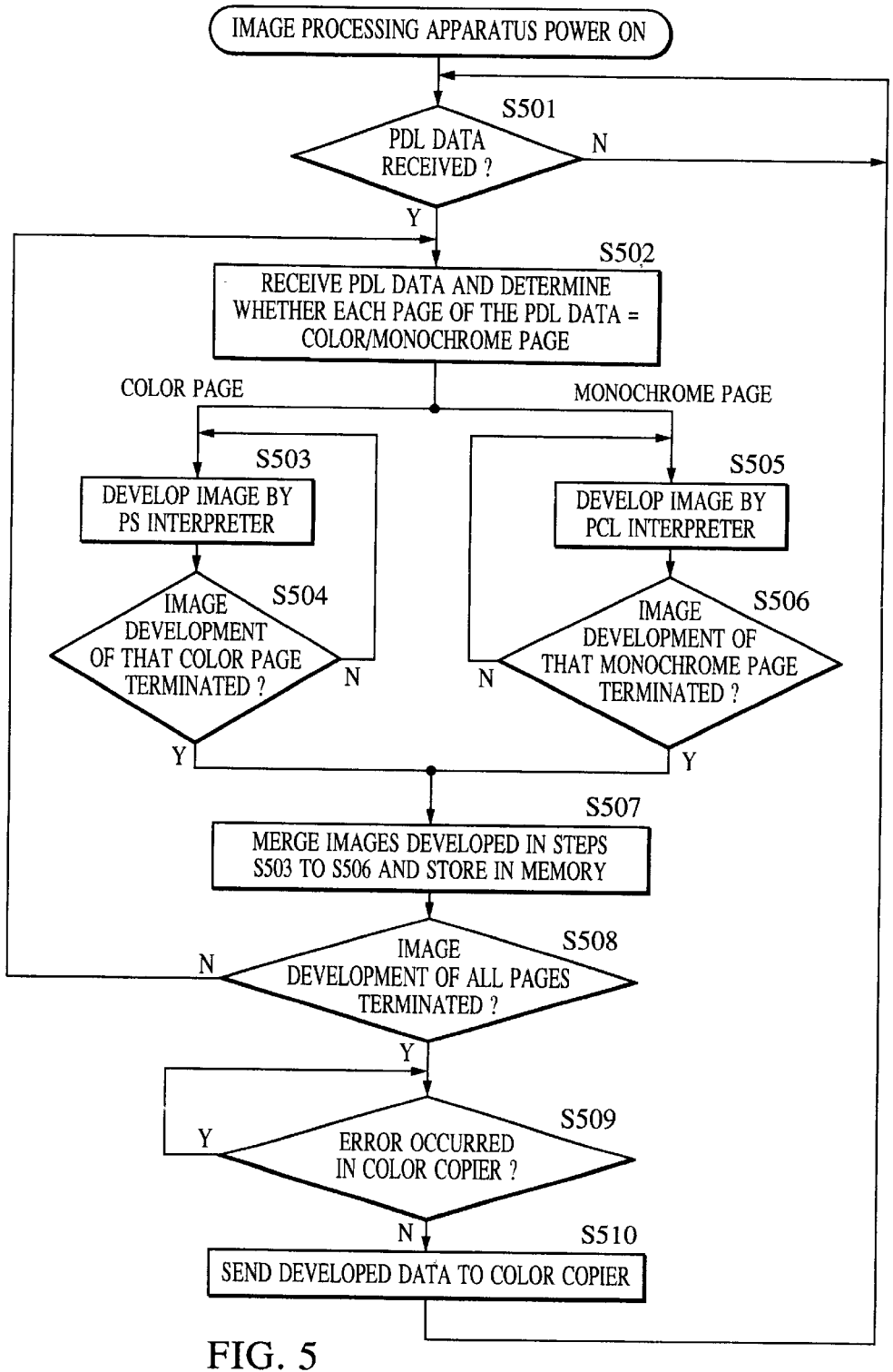
FIG. 5 is a flowchart showing an example of a first data processing procedure of the image processing apparatus according to the present invention.

FIG. 5 is a flowchart showing an example of a first data processing procedure of the image processing apparatus 110 according to the present embodiment of the present invention. S501 to S510 each indicate a step.

Initially, in step S501, a check is made to determine whether PDL data for the color copier 120 has been received. When it is determined that PDL data has been received, in step S502, the PDL data is received, and it is determined whether the data is for a color or a monochrome page. When it is determined at that time that the data is for a color page, in steps S503 and S504, the image development of that page is performed by the PostScript interpreter, and the process proceeds to step S507 and subsequent steps.

When, on the other hand, it is determined in step S502 that the data is for a monochrome page, in steps S505 and S506, the image development of that page is performed by the PCL interpreter. Next, in step S507, the pages developed in steps S503 to S506 are merged so that they are in a desired page sequence, and are stored in memory.

Then, in step S508, a check is made to determine whether or not the image development of all the pages has been terminated, and if not, processing from steps S502 to S507 is repeated until the image development is terminated.

Next, in step S509, a check is made to determine whether or not an error has occurred in the color copier 120. If an error has occurred, the process waits until the error is rectified. After it is confirmed that no unrectified error has occurred, in step S510, the developed image data is sent to the color copier 120. Thereafter, the process goes to step S501, and the above-described processing is repeated.

Figure 6:
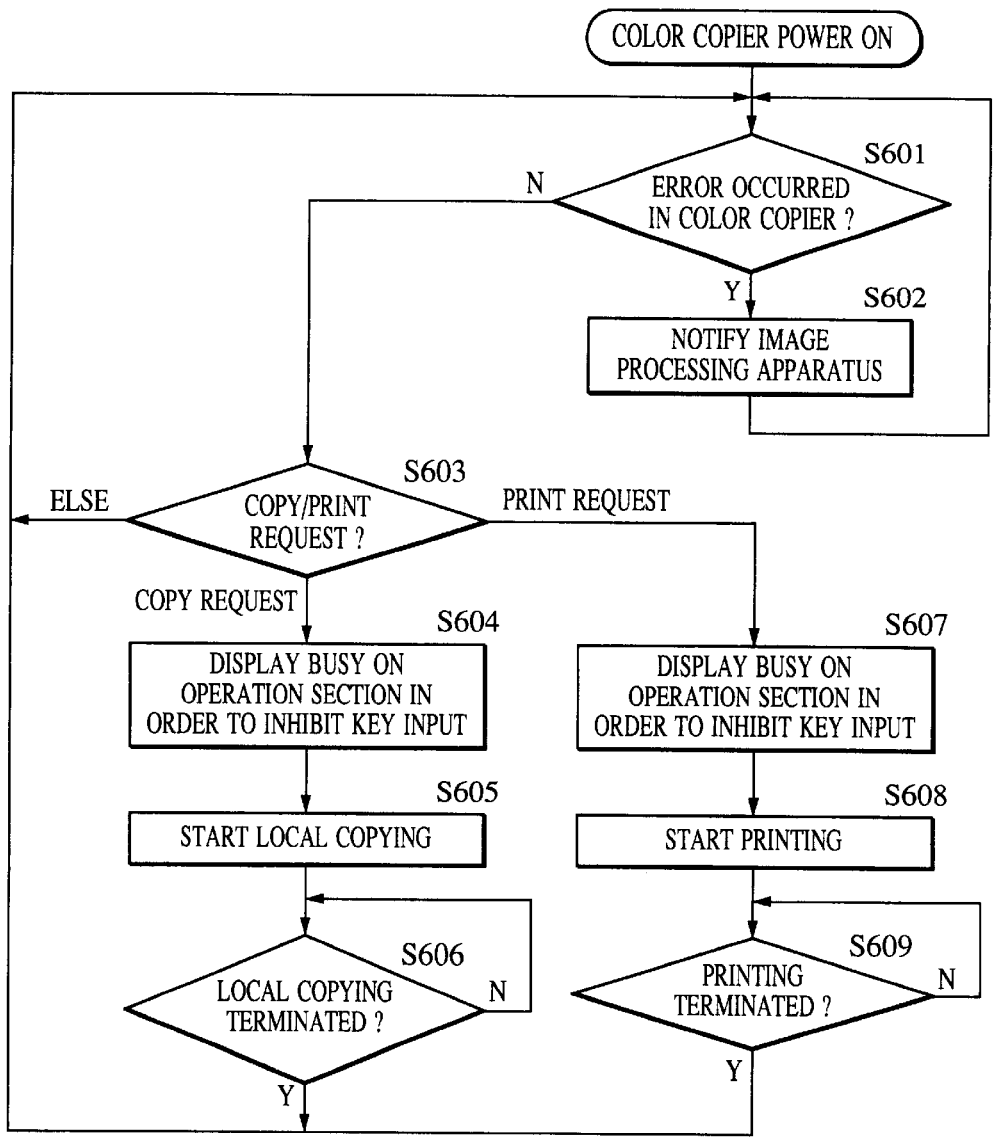
FIG. 6 is a flowchart showing an example of the first data processing procedure of the image processing apparatus according to the present invention.

FIG. 6 is a flowchart showing an example of the first data processing procedure in an image forming apparatus according to the present embodiment of the present invention, corresponding to the control procedure of the color copier 120 shown in FIG. 1.

Initially, in step S601, a check is made to determine whether or not an error has occurred in the color copier 120. If an error has occurred, in step S602, the type of error is communicated to the image processing apparatus 110, and the process returns to step S601.

On the other hand, when it is determined in step S601 that no error has occurred, the process proceeds to the subsequent process, and in step S603, a check is made to determine whether or not there is a copy/print request. When it is determined at this time that there is a copy request, in step S604, "busy" is displayed on an operation panel 3026 of the color copier 120; at this time, key input from the operation panel 3026 is inhibited (not accepted). Then, in steps S605 and S606, a local copy process is performed, and after the local copy process is terminated, the overall process goes to step S601, and processing of this step and subsequent steps is repeated.

When, on the other hand, it is determined in step S603 that there is a print request, in step S607, "busy" is displayed on the operation panel 3026, again preventing key input from the operation panel 3026. Then, in steps S608 and S609, remote printing is performed using the developed data sent from the image processing apparatus 110. After the printing is terminated, the process goes to step S601, and processing of this step and subsequent steps is repeated.

According to this embodiment, since image development, a strong point of the PostScript/PCL interpreter, becomes possible in page units, improvements in processing performance, output image, etc., can be expected. At the same time, from the user side, the labor of installing a printer driver for each interpreter is not required, improving ease of operation.

Second Embodiment

Unlike the first embodiment, the features of this embodiment are that the second embodiment is effective in a case in which the printer driver in the host computers 101 to 103 cannot discharge data which can be handled by both interpreters for PostScript/PCL. In this embodiment, inside the image processing apparatus 110, conversion from PostScript data into PCL data or conversion from PCL data into PostScript data is performed as needed, and image development is performed by each interpreter.

With this construction, by using the existing PostScript/PCL driver, image development by both interpreters for PostScript/PCL becomes possible. As a result, in a manner similar to the first embodiment, improvements in processing performance, output image, etc., can be expected.

A description is given below in detail by using a control flow showing the features of this embodiment.

Figure 7:
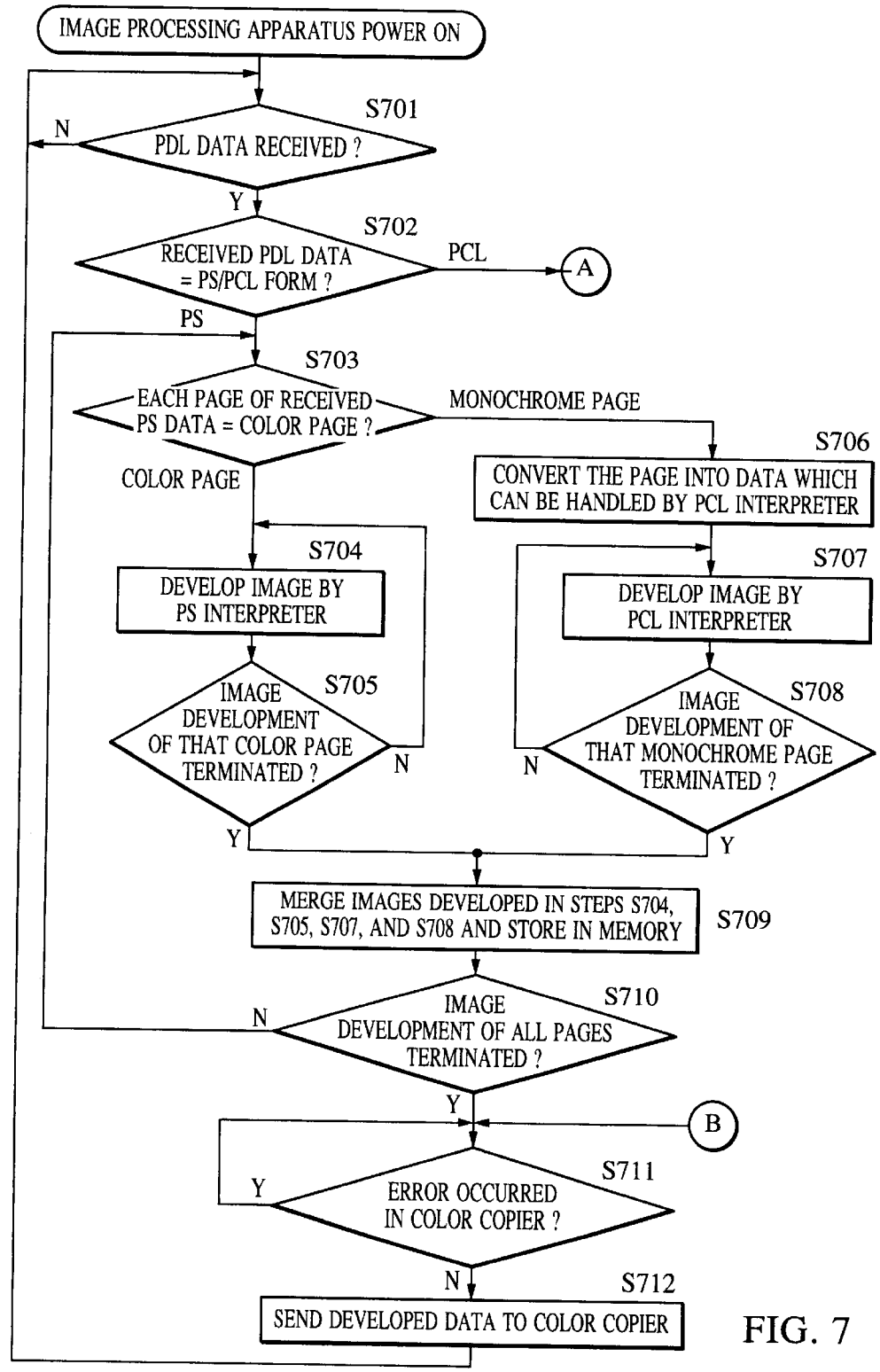
FIG. 7 is a flowchart showing an example of a second data processing procedure of the image processing apparatus according to the present invention.
Figure 8:
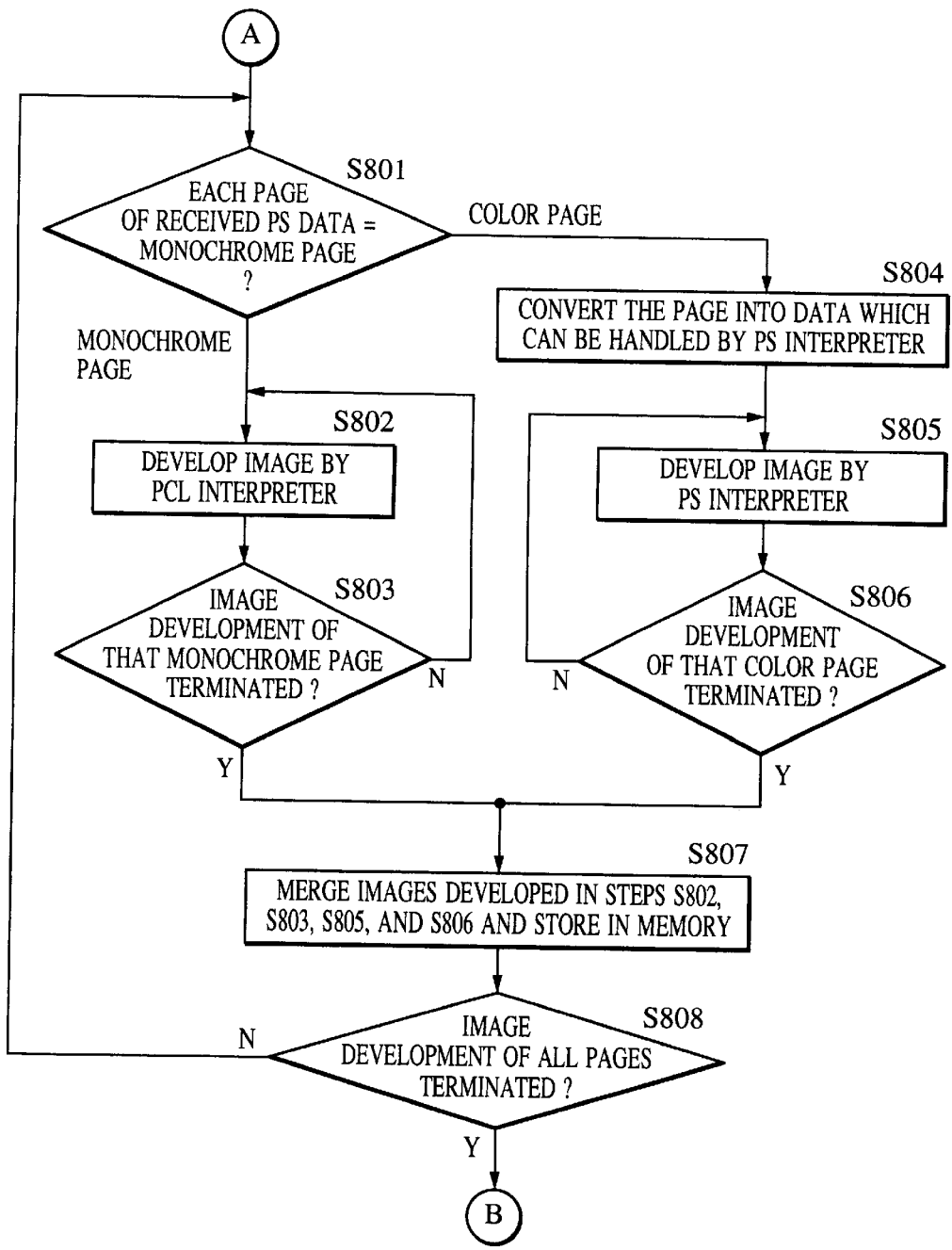
FIG. 8 is a flowchart showing an example of the second data processing procedure of the image processing apparatus according to the present invention.

FIGS. 7 and 8 are flowcharts showing an example of a second data processing procedure of the image processing apparatus according to one embodiment of the present invention, corresponding to the control procedure on the image processing apparatus 110 side shown in FIG. 1. S701 to S712 and S801 to S808 each indicate a step.

Initially, in step S701, a check is made to determine whether or not PDL data for the color copier 120 has been received. When it is determined that PDL data has been received, then in step S702, it is determined whether the received PDL data is PostScript data or PCL data. When it is determined at the time that the received PDL data is PostScript data, a subsequent image development process for PS data is performed. When it is determined that the received PDL data is PCL data, a subsequent image development process for PCL data is performed.

First, the case of PostScript data is described. In step S703, it is determined whether the data is for a color or a monochrome page. When it is determined at that time that the data is for a color page, in steps S704 and S705, the image development of that page is performed by the PostScript interpreter. When it is determined that the data is for a monochrome page, first in step S706, that page is converted into data which can be handled by the PCL interpreter, and in steps S707 and S708, the image development of that page is performed by the PCL interpreter.

Next, in step S709, all the pages developed in steps S704 and S705 and in steps S707 and S708 are merged so that they are in a desired page sequence, and are stored in memory. Then, in step S710, a check is made to determine whether or not the image development of all the pages has been terminated, and processing from steps S703 to S709 is repeated until the image development is terminated.

Next, in step S711, a check is made to determine whether or not an error has occurred in the color copier. If an error has occurred, waiting continues until the error is rectified. After it is confirmed that no unrectified error has occurred, in step S712, the developed image data is sent to the color copier. Thereafter, the process goes to step S701, and the above-described processing is repeated.

Processing in a case in which the data is determined to be PCL data in step S702 is described below.

When it is determined in step S702 (described earlier) that the data is determined to be PCL data, initially, in step S801 shown in FIG. 8, it is determined whether the data is for a color or a monochrome page. When the data is determined to be for a monochrome page, in steps S802 and S803, the image development of that page is performed by the PCL interpreter. When the data is determined to be for a color page, first in step S804, the page is converted into data which can be handled by the PostScript interpreter, and then in steps S805 and S806, the image development of that page is performed by the PostScript interpreter.

Next, in step S807, all the pages developed in steps S802 and S803 and in steps S805 and S806 are merged so that the pages are in a desired page sequence and are stored in the memory.

Then, in step S808, a check is made to determine whether or not the image development of all the pages has been terminated, and processing from steps S801 to S807 is repeated until the image development is terminated. Thereafter, the process goes to step S711 shown in FIG. 7, and the subsequent processing is repeated.

The control flowchart (FIG. 6) of the color copier of this embodiment is the same as that of the first embodiment, and accordingly, a description thereof is omitted.

Third Embodiment

This embodiment is an improvement of the first embodiment. The features of this embodiment are as follows. A determination as to whether a page is a color or a monochrome page is made from the received PDL data (including the color or monochrome page data), the image development of all the color pages is performed first and is stored in memory, and then the image development of all the monochrome pages is performed and is stored in memory. Thereafter, the images stored in memory are selected so that they are in a desired page sequence, and the images are sent to the color copier. Of course, as an alternative to the sequence just described, the image development of the monochrome pages may be performed first.

With this construction, since there is no need to switch interpreters frequently with respect to color and monochrome pages (in particular, in a document in which color and monochrome pages alternate or are mixed together), the number of times the interpreters are switched is reduced, and an improvement in performance can be anticipated.

Figure 9:
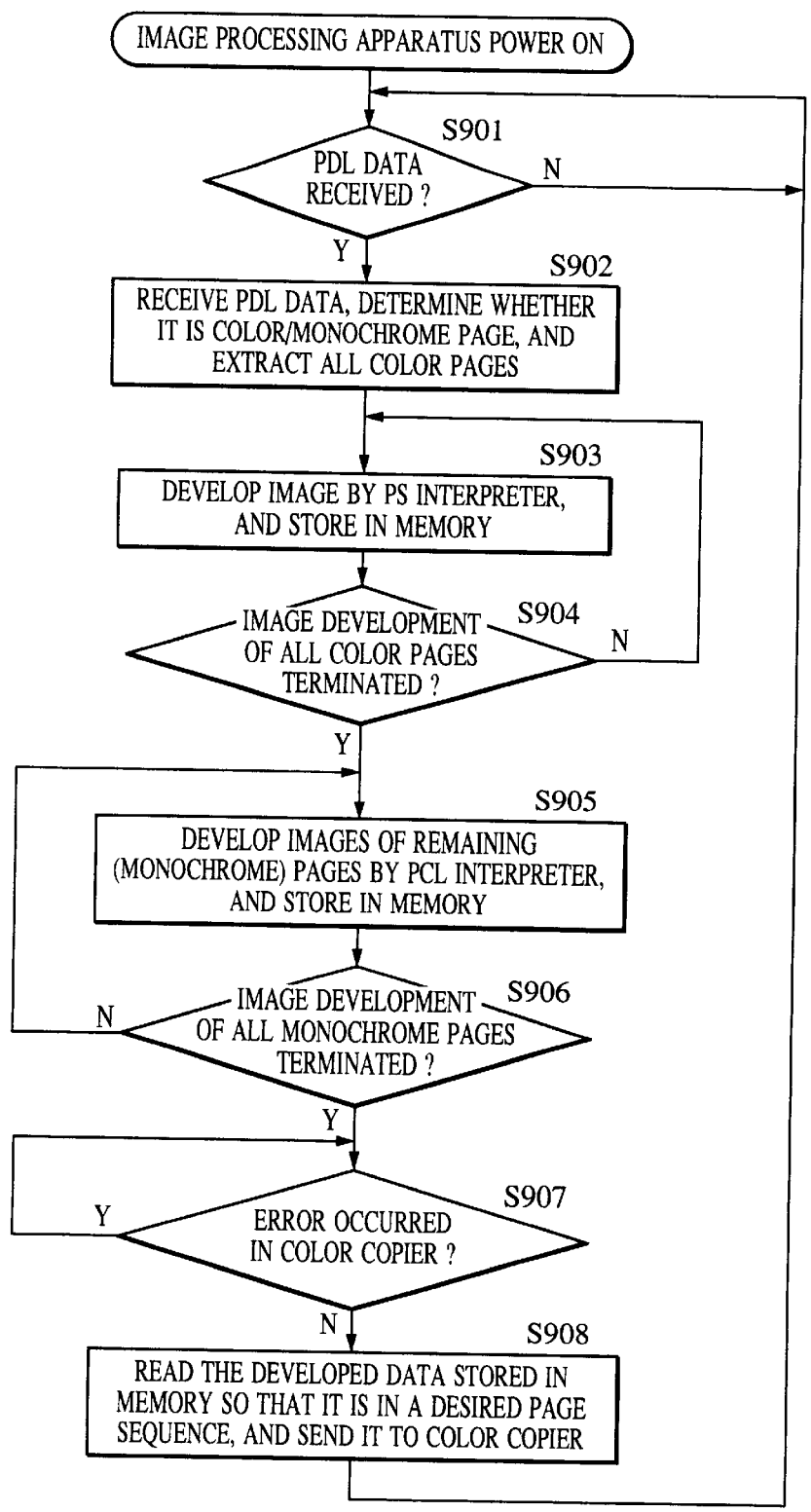
FIG. 9 is a flowchart showing an example of a third data processing procedure of the image processing apparatus according to the present invention.

FIG. 9 is a flowchart showing an example of a third data processing procedure of the image processing apparatus according to the embodiment of the present invention, corresponding to the control procedure on the image processing apparatus 110 side shown in FIG. 1. S901 to S908 each indicate a step.

Initially, in step S901, a check is made to determine whether or not PDL data for the color copier 120 has been received. When it is determined that PDL data has been received, in step S902, the PDL data is received, it is determined whether the PDL data is for a color or a monochrome page, and all the color pages are extracted. Then, in steps S903 and S904, the image development of all the color pages is performed, and the developed images are stored in memory.

Next, in steps S905 and S906, the image development of the remaining (monochrome) pages is performed, and the developed images are stored in memory. In addition, although in the description herein the image development of color pages is performed first, the image development of monochrome pages may instead be performed first.

Next, in step S907, a check is made to determine whether or not an error has occurred in the color copier 120. If an error has occurred, the process waits until the error is rectified. After the error is rectified, in step S908, the developed images stored in the memory are read so that they are in a desired page sequence and are sent to the color copier 120. Thereafter, the process goes to step S901, and the above-described processing is repeated. Since the control (the control procedure shown in FIG. 6) of the color copier 120 of this embodiment is the same as that of the first embodiment, description thereof is omitted.

According to the above-described embodiment, it is possible for each interpreter to develop images for which it is best suited, and improvements, etc., in performance and image output can be expected. Also, there is no need to install a printer driver corresponding to each interpreter, and there is no need for the printing to require monitoring. Therefore, improvements in ease of operation are anticipated.

Referring to the memory map shown in FIG. 10, a description is given of the structure of a data processing program which can be read by an image processing system to which an image processing apparatus according to the present invention can be applied.

FIG. 10 shows a memory map of a storage medium for storing various data processing programs which can be read by an image processing system to which the image processing apparatus according to the present invention can be applied.

Although not particularly shown, there is a case in which information for managing a program group stored in a storage medium, for example, version information, the creator, etc., is stored, and information dependent on the OS on the program reading side, for example, an icon for displaying a program so as to be identified, is also stored.

In addition, data related to various programs is also managed in the directory. There is also a case in which a program for installing various programs in the computer, a program for decompressing a compressed program for installation, etc., are stored.

The functions shown in FIGS. 5 to 9 in this embodiment may be executed by a host computer in accordance with a program installed from the outside. In such a case, the present invention can be applied even to a case in which an information group containing a program is supplied to an output apparatus from a storage medium, such as a CD-ROM, a flash memory, or an FD, or from an external storage medium via a network.

It is a matter of course that the object of the present invention is also achieved by supplying a storage medium having recorded thereon program codes of software, for realizing the functions of the above-described embodiment, to a system or an apparatus, and by reading and executing the program codes stored in the storage medium by a computer (or a CPU or MPU) of the system or the apparatus in the manner as described above.

In this case, the program codes themselves which are read from the storage medium realize the novel functions of the present invention, and the storage medium storing the program codes constitutes the present invention.

As a storage medium for supplying such program codes, for example, a floppy disk, a hard disk, an optical disk, an magneto-optical disk, a CD-ROM, a CD-R, a magnetic tape, a non-volatile memory card, a ROM, an EEPROM, etc., can be used.

Furthermore, in addition to the case where the functions of the above-described embodiment are realized by the execution of program codes read by a computer, a case in which an OS (operating system) operating on a computer performs a part or the entirety of actual processing according to the instructions of the program codes, and the functions of the above-described embodiment are realized by the processing, is included within the scope of the present invention.

Furthermore, it is a matter of course that the following case is included in the present invention: after program codes read from a storage medium are written into a memory provided in a function expansion board inserted into a computer or a function expansion unit connected to a computer, a CPU or the like provided in that function expansion board or in that function expansion unit performs a part or the entirety of actual processing according to the instructions of the program codes, and the functions of the above-described embodiment are realized by that processing.

Fourth Embodiment

In this embodiment, in a host computer, color pages and monochrome pages are identified page by page, and with respect to each page, PS-PDL data is output for a color page, and PCL-PDL data is output for a monochrome page.

On the other hand, on the image processing apparatus side, image development is performed based on the received PDL data (including color/monochrome page data), and is stored in the memory, and thereafter, the image is sent to the color copier.

Figure 15:
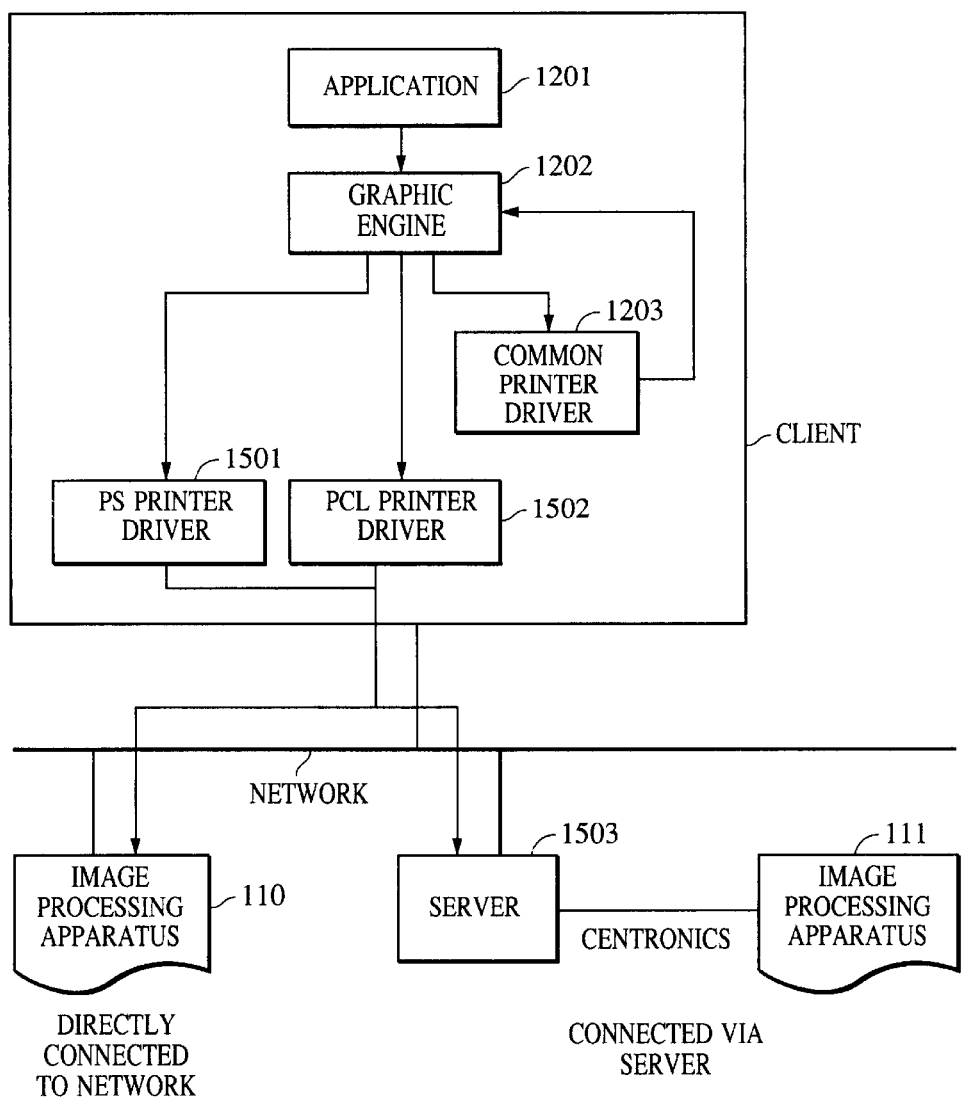
FIG. 15 is a block diagram illustrating a printing process mode in the image processing system according to the present invention.

Since the processing on the host computer side has such features, a detailed description is given with reference to FIG. 15. Since in the processing on the image processing apparatus side, only image development is performed in accordance with PDL data sent from a host computer, a detailed description is omitted.

FIG. 15 is a block diagram illustrating a printing process mode in the image processing system according to the present invention, corresponding to an example of a system in which, in particular, printer drivers 1501 and 1502 (PostScript and PCL) corresponding to the image processing apparatuses 110 and 111, and a common printer driver 1203 are present in a client host computer for creating printing data.

In FIG. 15, reference numeral 1203 denotes a common printer driver for creating printing intermediate data which is independent of the image processing apparatuses 110 and 111 in the network. Formation of intermediate data leads to shortened creation time when PDL data dependent on PS or PCL is created in accordance with printer drivers 1501 and 1502 (to be described later). Reference numeral 1501 denotes a PS-compatible printer driver, which creates print data dependent on PS on the basis of the above-mentioned print intermediate data. Reference numeral 1502 denotes a PCL-compatible printer driver, which creates print data dependent on PCL on the basis of the above-mentioned print intermediate data. Then, PS or PCL data is created in page units and is sent to the image processing apparatus 110 or 111. Although not shown, it is possible for the image processing apparatus 110 to be connected as a local printer for the client host computer via a centronics interface.

The image processing apparatus 111 is connected to a server 1503 so as to be capable of communicating with each other 1503 via a centronics interface. The image processing apparatuses 110 and 111 comprise a network card and communicate with the printer drivers 1501 and 1502 in accordance with a predetermined protocol.

As has thus been described, according to the embodiments of the present invention, PDL data based on a plurality of page description languages is received from an external image processing apparatus. A determination is made as to whether image information in the PDL data is color image information or monochrome image information. A first development process which is most suitable for color image information and a second development process which is most suitable for monochrome image information are performed in a parallel manner. The developed color image information and monochrome image information are output to an image output apparatus. Thus, advantages can be exhibited, for example, it is possible to develop the image information in the received PDL data by effectively using individual development processing resources, making it possible to efficiently output image data having superior image quality in comparison with that of an image development process dependent on single development processing resources.

Although in the above-described embodiments, PostScript and PCL are explained as examples of PDL, other PDLs which are suitable for color images or monochrome images may be used.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus comprising:

a receiver, arranged to receive image information, based on first and second page description languages, which is input from an external data processing apparatus;

an image-type discriminator, capable of determining which one of color image information and monochrome given image information is, said discriminator being arranged to receive the image information received by said receiver and to determine whether that information is color or monochrome;

a color development unit, arranged to receive and develop the color image information, responsive to a determination result produced by said discriminator, into color image data for each pixel;

a monochrome development unit, arranged to receive and develop the monochrome image information, responsive to the determination result produced by said discriminator, into monochrome image data for each pixel;

a data merger, arranged to receive and merge the color image data and the monochrome image data developed respectively by said color and monochrome development units, in a page sequence;

memory arranged to receive and store output image data from said data merger; and an output unit that outputs the output image data stored by said memory, to an external image output apparatus, wherein said development units develop one of color image data and monochrome image data by analyzing one of (i) image information based on the first and second page description languages and (ii) image information based on one of first and second page description languages, which is created by the external data processing apparatus.

2. An image processing apparatus comprising:

a receiver, arranged to receive image information, based on first and second page description languages, which is input from an external data processing apparatus;

an image-type discriminator, capable of determining which one of color image information and monochrome given image information is, said discriminator being arranged to receive the image information received by said receiver and to determine whether that information is color or monochrome;

a color development unit, arranged to receive and develop the color image information, responsive to a determination result produced by said discriminator, into color image data for each pixel;

a monochrome development unit, arranged to receive and develop the monochrome image information, responsive to the determination result produced by said discriminator, into monochrome image data for each pixel;

a data merger, arranged to receive and merge the color image data and the monochrome image data developed respectively by said color and monochrome development units, in a page sequence;

memory arranged to receive and store output image data from said data merger; and an output unit that outputs the output image data stored by said memory, to an external image output apparatus, wherein said discriminator determines whether the image information is color image information or monochrome image information, in page units, and wherein said color development unit performs image development in page units on the basis of the color image information, and wherein said monochrome development unit performs image development in page units on the basis of the monochrome image information.

3. An image processing apparatus comprising:

a receiver, arranged to receive image information, based on first and second page description languages, which is input from an external data processing apparatus;

an image-type discriminator, capable of determining which one of color image information and monochrome given image information is, said discriminator being arranged to receive the image information received by said receiver and to determine whether that information is color or monochrome;

a color development unit, arranged to receive and develop the color image information, responsive to a determination result produced by said discriminator, into color image data for each pixel;

a monochrome development unit, arranged to receive and develop the monochrome image information, responsive to the determination result produced by said discriminator, into monochrome image data for each pixel;

a data merger, arranged to receive and merge the color image data and the monochrome image data developed respectively by said color and monochrome development units, in a page sequence;

memory arranged to receive and store output image data from said data merger; and an output unit that outputs the output image data stored by said memory, to an external image output apparatus, wherein said data processing apparatus is adapted to communicate with the external data processing apparatus via a predetermined communication medium.

4. An image processing apparatus according to claim 3, wherein the predetermined communication medium includes a network.

5. An image processing apparatus according to claim 4, wherein said network includes a first network, having a first topology, which is connected to the predetermined communication medium via a server, and a second network, having a second topology, which is connected directly to the predetermined communication medium.

6. An image processing apparatus comprising:

a receiver, arranged to receive image information, based on first and second page description languages, which is input from an external data processing apparatus;

an image-type discriminator, capable of determining which one of color image information and monochrome given image information is, said discriminator being arranged to receive the image information received by said receiver and to determine whether that information is color or monochrome;

a color development unit, arranged to receive and develop the color image information, responsive to a determination result produced by said discriminator, into color image data for each pixel;

a monochrome development unit, arranged to receive and develop the monochrome image information, responsive to the determination result produced by said discriminator, into monochrome image data for each pixel;

a data merger, arranged to receive and merge the color image data and the monochrome image data developed respectively by said color and monochrome development units, in a page sequence;

memory arranged to receive and store output image data from said data merger; and an output unit that outputs the output image data stored by said memory, to an external image output apparatus, wherein said data merger merges pages so that the pages are in a desired page sequence.

7. An image processing apparatus comprising:

a receiver, arranged to receive image information, based on first and second page description languages, which is input from an external data processing apparatus;

an image-type discriminator, capable of determining which one of color image information and monochrome given image information is, said discriminator being arranged to receive the image information received by said receiver and to determine whether that information is color or monochrome;

a color development unit, arranged to receive and develop the color image information, responsive to a determination result produced by said discriminator, into color image data for each pixel;

a monochrome development unit, arranged to receive and develop the monochrome image information, responsive to the determination result produced by said discriminator, into monochrome image data for each pixel;

a data merger, arranged to receive and merge the color image data and the monochrome image data developed respectively by said color and monochrome development units, in a page sequence;

memory arranged to receive and store output image data from said data merger; and an output unit that outputs the output image data stored by said memory, to an external image output apparatus, wherein said output unit outputs a color image and a monochrome image in page units to the external image output apparatus.

8. An image processing apparatus comprising:

a receiver, arranged to receive image information, based on one of first and second page description languages, which is input from an external data processing apparatus;

an image-type discriminator, capable of determining which one of color and monochrome given image information is, said discriminator being arranged to receive the image information received by said receiver and to determine whether that image information is color or monochrome;

a color development unit, arranged to receive and develop image information based on the first page description language into color image data for each pixel;

a monochrome development unit, arranged to receive and develop image information based on the second page description language into monochrome image data for each pixel;

a converter that converts specific image information in the image information, based on one of the first and second page description languages, as determined by said discriminator, into image information which can be analyzed by one of said monochrome and said color development units, respectively;

a development controller for causing one of said development units to develop image information converted by said converter;

a data merger, arranged to receive and merge the color image data and the monochrome image data developed by one of said development units, in a page sequence;

memory arranged to receive and store the output image data from said data merger; and an output unit that outputs the output image data stored by said memory, to an external image output apparatus, wherein said development units each develop one of color image data and monochrome image data by analyzing one of (i) image information based on the first and second page description languages and (ii) image information based on one of first and second page description languages and created by the data processing apparatus.

9. An image processing apparatus comprising:

a receiver, arranged to receive image information, based on one of first and second page description languages, which is input from an external data processing apparatus;

an image-type discriminator, capable of determining which one of color and monochrome given image information is, said discriminator being arranged to receive the image information received by said receiver and to determine whether that image information is color or monochrome;

a color development unit, arranged to receive and develop image information based on the first page description language into color image data for each pixel;

a monochrome development unit, arranged to receive and develop image information based on the second page description language into monochrome image data for each pixel;

a converter that converts specific image information in the image information, based on one of the first and second page description languages, as determined by said discriminator, into image information which can be analyzed by one of said monochrome and said color development units, respectively;

a development controller for causing one of said development units to develop image information converted by said converter;

a data merger, arranged to receive and merge the color image data and the monochrome image data developed by one of said development units, in a page sequence;

memory arranged to receive and store the output image data from said data merger; and an output unit that outputs the output image data stored by said memory, to an external image output apparatus, wherein said discriminator determines whether the image information is color image information or monochrome image information, in page units, and wherein said color development unit performs image development in page units on the basis of the color image information, and wherein said monochrome development unit performs image development in page units on the basis of the monochrome image information.

10. An image processing apparatus comprising:

a receiver, arranged to receive image information, based on one of first and second page description languages, which is input from an external data processing apparatus;

an image-type discriminator, capable of determining which one of color and monochrome given image information is, said discriminator being arranged to receive the image information received by said receiver and to determine whether that image information is color or monochrome;

a color development unit, arranged to receive and develop image information based on the first page description language into color image data for each pixel;

a monochrome development unit, arranged to receive and develop image information based on the second page description language into monochrome image data for each pixel;

a converter that converts specific image information in the image information, based on one of the first and second page description languages, as determined by said discriminator, into image information which can be analyzed by one of said monochrome and said color development units, respectively;

a development controller for causing one of said development units to develop image information converted by said converter;

a data merger, arranged to receive and merge the color image data and the monochrome image data developed by one of said development units, in a page sequence;

memory arranged to receive and store the output image data from said data merger; and an output unit that outputs the output image data stored by said memory, to an external image output apparatus, wherein said data merger merges pages so that the pages are in a desired page sequence.

11. An image processing apparatus comprising:

a receiver, arranged to receive image information, based on one of first and second page description languages, which is input from an external data processing apparatus;

an image-type discriminator, capable of determining which one of color and monochrome given image information is, said discriminator being arranged to receive the image information received by said receiver and to determine whether that image information is color or monochrome;

a color development unit, arranged to receive and develop image information based on the first page description language into color image data for each pixel;

a monochrome development unit, arranged to receive and develop image information based on the second page description language into monochrome image data for each pixel;

a converter that converts specific image information in the image information, based on one of the first and second page description languages, as determined by said discriminator, into image information which can be analyzed by one of said monochrome and said color development units, respectively;

a development controller for causing one of said development units to develop image information converted by said converter;

a data merger, arranged to receive and merge the color image data and the monochrome image data developed by one of said development units, in a page sequence;

memory arranged to receive and store the output image data from said data merger; and an output unit that outputs the output image data stored by said memory, to an external image output apparatus, wherein said image processing apparatus is adapted to communicate with an external data processing apparatus via a predetermined communication medium.

12. An image processing apparatus comprising:

a receiver, arranged to receive image information, based on one of first and second page description languages, which is input from an external data processing apparatus;

an image-type discriminator, capable of determining which one of color and monochrome given image information is, said discriminator being arranged to receive the image information received by said receiver and to determine whether that image information is color or monochrome;

a color development unit, arranged to receive and develop image information based on the first page description language into color image data for each pixel;

a monochrome development unit, arranged to receive and develop image information based on the second page description language into monochrome image data for each pixel;

a converter that converts specific image information in the image information, based on one of the first and second page description languages, as determined by said discriminator, into image information which can be analyzed by one of said monochrome and said color development units, respectively;

a development controller for causing one of said development units to develop image information converted by said converter;

a data merger, arranged to receive and merge the color image data and the monochrome image data developed by one of said development units, in a page sequence;

memory arranged to receive and store the output image data from said data merger; and an output unit that outputs the output image data stored by said memory, to an external image output apparatus, wherein said output unit outputs a color image and a monochrome image in page units, to the image output apparatus.

13. An image processing apparatus comprising:

a receiver, arranged to receive image information, based on first and second page description languages, which is input from an external data processing apparatus;

an image-type discrimination that receives the image information and determines which one of color and monochrome the image information is;

a color-development unit that color-develops color image information determined by said discrimination into color image data for each pixel;

a monochrome development unit that monochrome-develops monochrome image information determined by said discrimination into monochrome image data for each pixel;

memory arranged to receive and individually store the color image data and the monochrome image data developed by one of said development units; and a page-sequence outputter controllable to read one of the color image data and the monochrome image data, which is stored by said memory in a page sequence, and outputting it to an external image output apparatus, wherein said development units develop one of color image data and monochrome image data by analyzing one of (i) image information based on the first and second page description languages and (ii) image information based on one of first and second page description languages and created by the data processing apparatus.

14. An image processing apparatus comprising:

a receiver, arranged to receive image information, based on first and second page description languages, which is input from an external data processing apparatus;

an image-type discrimination that receives the image information and determines which one of color and monochrome the image information is;

a color-development unit that color-develops color image information determined by said discrimination into color image data for each pixel;

a monochrome development unit that monochrome-develops monochrome image information determined by said discrimination into monochrome image data for each pixel;

memory arranged to receive and individually store the color image data and the monochrome image data developed by one of said development units; and a page-sequence outputter controllable to read one of the color image data and the monochrome image data, which is stored by said memory in a page sequence, and outputting it to an external image output apparatus, wherein said discrimination determines whether the image information is color image information or monochrome image information, in page units.

15. An image processing apparatus comprising:

a receiver, arranged to receive image information, based on at least one of first and second page description languages, which is input from an external data processing apparatus;

a color development unit that color-develops image information, based on the first page description language, which is received by said receiver, and develops it into color image data for each pixel;

a monochrome development unit that monochrome-develops image information, based on the second page description language, which is received by said receiver, and develops it into monochrome image data for each pixel;

memory arranged to receive and store output image data developed by said development units; and an outputter, which outputs the output image data stored in the storage means to an external image output apparatus, wherein said development units analyze image information, based on at least one of the first and second page description languages, which is created by the data processing apparatus, and develop it into color image data or monochrome image data, respectively, and wherein said color development unit performs image development in page units on the basis of the color image information, and wherein said monochrome development unit performs image development on the basis of monochrome image information in page units.

16. An image processing apparatus comprising:

a receiver, arranged to receive image information, based on at least one of first and second page description languages, which is input from an external data processing apparatus;

a color development unit that color-develops image information, based on the first page description language, which is received by said receiver, and develops it into color image data for each pixel;

a monochrome development unit that monochrome-develops image information, based on the second page description language, which is received by said receiver, and develops it into monochrome image data for each pixel;

memory arranged to receive and store output image data developed by said development units; and an outputter, which outputs the output image data stored in the storage means to an external image output apparatus, wherein said data processing apparatus is adapted to communicate with the external data processing apparatus via a predetermined communication medium.

17. An image processing apparatus according to claim 16, wherein said predetermined communication medium includes a network.

18. An image processing apparatus according to claim 17 wherein said network includes a first network, having a topology which is connected to the predetermined communication medium via a server, and a second network, having a topology which is connected directly to the predetermined communication medium.

19. An image processing apparatus comprising:

a receiver, arranged to receive image information, based on at least one of first and second page description languages, which is input from an external data processing apparatus;

a color development unit that color-develops image information, based on the first page description language, which is received by said receiver, and develops it into color image data for each pixel;

a monochrome development unit that monochrome-develops image information, based on the second page description language, which is received by said receiver, and develops it into monochrome image data for each pixel;

memory arranged to receive and store output image data developed by said development units; and an outputter, which outputs the output image data stored in the storage means to an external image output apparatus, wherein said color development unit performs image development in page units on the basis of the color image information, and wherein said monochrome development unit performs image development on the basis of monochrome image information in page units.

20. An image processing apparatus comprising:

a receiver, arranged to receive image information, based on at least one of first and second page description languages, which is input from an external data processing apparatus;

a color development unit that color-develops image information, based on the first page description language, which is received by said receiver, and develops it into color image data for each pixel;

a monochrome development unit that monochrome-develops image information, based on the second page description language, which is received by said receiver, and develops it into monochrome image data for each pixel;

memory arranged to receive and store output image data developed by said development units; and an outputter, which outputs the output image data stored in the storage means to an external image output apparatus, wherein said receiver is capable of communicating with the external data processing apparatus via a predetermined communication medium.

21. An image processing apparatus comprising:

a receiver, arranged to receive image information, based on at least one of first and second page description languages, which is input from an external data processing apparatus;

a color development unit that color-develops image information, based on the first page description language, which is received by said receiver, and develops it into color image data for each pixel;

a monochrome development unit that monochrome-develops image information, based on the second page description language, which is received by said receiver, and develops it into monochrome image data for each pixel;

memory arranged to receive and store output image data developed by said development units; and an outputter, which outputs the output image data stored in the storage means to an external image output apparatus, wherein said outputter outputs at least one of a color image and a monochrome image in page units to the image output apparatus.

* * * * *

UNITED STATES PATENT AND TRADEMARK OFFICE
CERTIFICATE OF CORRECTION

PATENT NO. : 6,804,028 B1 Page 1 of 1
DATED : October 12, 2004
INVENTOR(S) : Fukuta It is certified that error appears in the above-identified patent and that said Letters Patent is hereby corrected as shown below:

Column 13,
Line 3, "1503" should be deleted.

Column 19,
Lines 27 and 55, "data-and" should read -- data and --.

Column 20,
Line 54, "claim 17" should read -- claim 17, --.

Signed and Sealed this

Seventh Day of February, 2006

JON W. DUDAS
*Director of the United States Patent and Trademark Office*